United States Patent Office 2,820,881
Patented Jan. 21, 1958

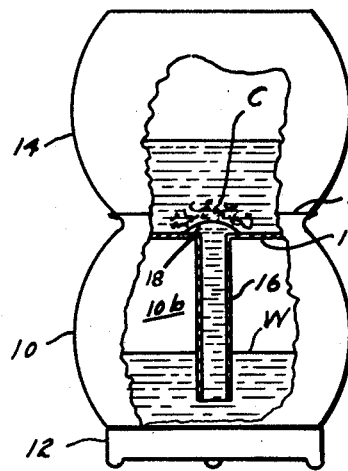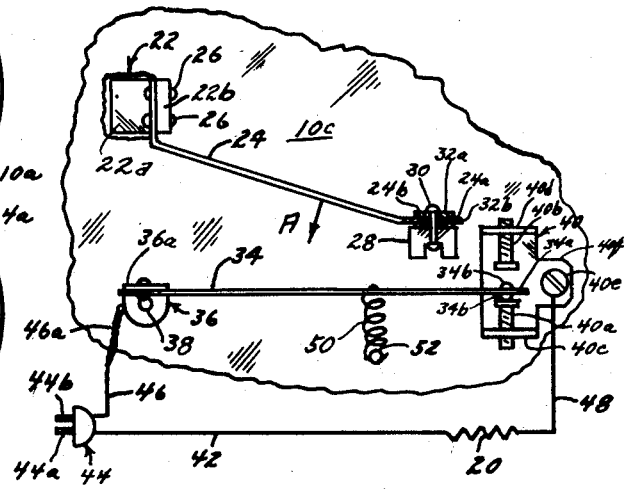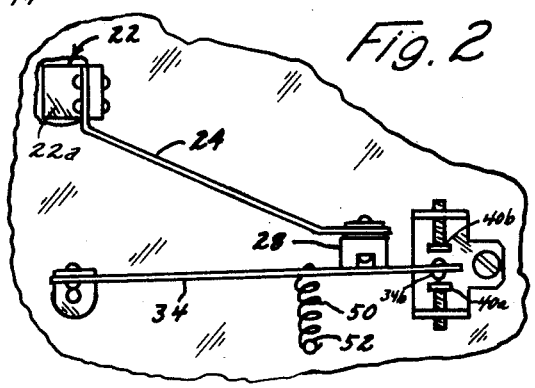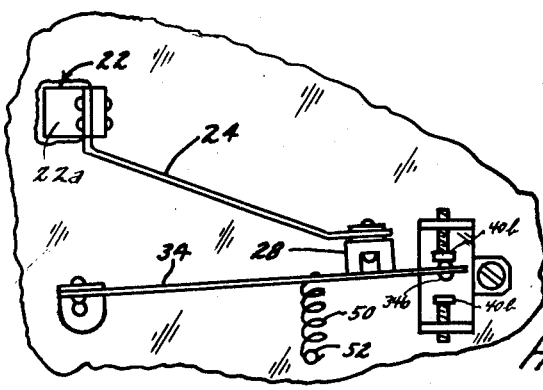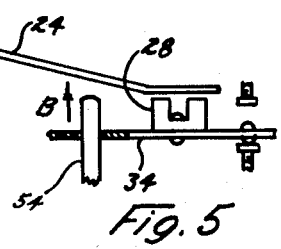
Alfred J. Huck INVENTOR.

2,820,881

VACUUM TYPE COFFEE MAKER AND CYCLING SWITCH MECHANISM THEREFOR

Alfred J. Huck, St. Louis, Mo., assignor to Knapp-Monarch Company, St. Louis, Mo., a corporation of Delaware Application April 12, 1954, Serial No. 422,340

12 Claims. (Cl. 219—44)

This invention relates to an improved coffee maker of the vacuum type and to an improved cycling switch therefor which programs the heating to achieve coffee making and thereafter maintains the brew at a warm temperature for consumption.

In a vacuum type coffee maker an upper bowl for coffee is received on a lower bowl containing water. A transfer tube depends from the upper bowl into the lower bowl so that when the water in the lower bowl is boiled it is forced up the transfer tube at virtually boiling temperature to mix with the coffee grounds to form a brew. The heating of the lower bowl is temporarily interrupted when the water has been completely transferred so that by gravity and vacuum action the brew is drawn down the transfer tube and into the lower bowl. The coffee making operation is complete at this time and thereafter it is only necessary to keep the brew at a warm coffee-serving temperature.

In the apparatus herein disclosed the operation of a vacuum type coffee maker is programmed by the use of a thermostatic blade affixed to the lower bowl to flex in accord with the temperature thereof. This blade carries a magnet on its free end and coacts with a swingable switch blade located in its path of travel. The swingable switch blade cooperates with a pair of spaced contacts to establish an energizing circuit to the heater of the coffee maker when contact is made with either of the spaced contacts. The swingable switch blade is biased towards the more remote of the spaced contacts in relation to the direction of swing of the thermostatic blade. As the thermostatic blade swings to the position corresponding to boiling of the water from the lower bowl— that is it exceeds water-boiling temperature—the magnet is brought to a position wherein it attracts the switch blade and moves the same from the more remote contact. The heater is thus de-energized. Thereafter the two blades—held together by the magnet—move in unison away from the more remote contact as the thermostatic blade cools. This motion eventually causes the switch blade to make contact with the less remote contact, restoring the heating and causing the lower bowl temperature to cycle about a comparatively low keep-warm temperature for serving.

When it is desired to discontinue keep-warm operation, the source of electrical energy can be disconnected to cause the thermostatic blade to cool until it overcomes the magnet attraction for the switch blade and separates therefrom. The unit is thus conditioned for a new cycle of operation when the source of electrical energy is reconnected. In an alternative embodiment described herein this conditioning is achieved by a manually operated member which overcomes the magnet force to separate the magnet carrying thermostatic blade and the switch blade.

It is therefore a general object of the present invention to provide an improved vacuum type coffee maker and a cycling switch therefor.

A further object of the present invention is to provide an improved vacuum type coffee maker and a cycling switch therefor in which magnetic action serves to program the cycle of operation.

Still another object of the present invention is to provide an improved vacuum type coffee maker and a cycling switch therefor in which a single switch blade serves as both a brewing control and keeps-warm control to the end that a simple and rugged structure is provided.

Yet another object of the present invention is to provide an improved vacuum type coffee maker wherein a single thermostatic member serves both to arrest further heating when the water is transferred to the upper bowl and to intermittently energize the heating element after the brew is formed.

It is still another object of the present invention to provide an improved vacuum type coffee maker wherein a magnet serves at one point in the cycle of operations to pull the contact-making switch out of contacting position and at later points in the cycle to affix the switch to the thermostat for movements in unison to achieve cycling operation to keep the brew warm.

The novel features which I believe to be characteristic of my invention are set forth with particularity in the appended claims. My invention itself, both as to its organization and method of operation, will best be understood by reference to the following description taken in conjunction with the accompanying drawings in which:

Figure 1 is a side elevational view with parts broken away showing a vacuum type coffee maker;

Figure 2 is an enlarged view from the bottom of the coffee maker of Figure 1 showing the control switch mechanism and in schematic form showing the electrical circuit, the parts having the positions they assume at the beginning of a heating cycle;

Figure 3 is a view like Figure 1 but showing the parts in the positions assumed after the water has been boiled from the lower bowl into the upper bowl and the unit is at the maximum temperature condition;

Figure 4 is a view like Figures 2 and 3 but showing the parts positioned for keep-warm operation; and Figure 5 is a fragmentary view showing an alternative form of the cycling switch mechanism.

Referring now to Figure 1 there is shown at 10 the lower bowl of a vacuum type coffee maker which is supported by a base 12 preferably of phenolic material. The lower bowl 10 terminates in a lip 10a which receives the upper bowl 14. The upper bowl 14 has a bottom 14a which has at its center a depending transfer tube 16 which extends well down into the lower bowl 10 as shown. The upper bowl is held in sealed position on the lip 10a of the lower bowl 10 by a suitable flexible gasket (not shown) of rubber or similar material. A screen 18 is positioned at the top of the transfer tube 16 and is held seated on the bottom 14a by suitable spring means (not shown).

In operation, coffee grounds C are placed over the screen 18 and water W is placed in the lower bowl 10. The bottom of lower bowl 10 is then heated by a suitable heater (not shown) until the water W boils to form steam in the space 10b and thus force the water through the transfer tube 16 into the upper bowl 14. When the water has substantially entirely transferred to the upper bowl 14 the heating is discontinued as described hereafter to cause the water to flow back into the lower bowl 10 due to the vacuum created as the lower bowl cools. The water is in the form of a brew as it transfers back into the lower bowl. Thereafter it is kept in a warm serving condition by recurrently energizing the heater as described hereafter.

Figure 2 shows the bottom of the lower bowl 10 as seen from beneath. The bottom is indicated generally at 10c. The heater 20, Figure 2, is affixed to the bottom at points not shown in Figure 2 so that as heater 20 is energized the bottom heats up. Preferably, the heater 20 is in circular form and surrounds the structure shown in Figure 2 and is brazed or otherwise firmly affixed to the bottom of the lower bowl. A bracket 22 is brazed or similarly affixed to the bottom 10c of the lower bowl and is of L-shaped conformation with a base pad 22a and a depending arm portion 22b. The bracket 22 is of copper or similar heat-conducting material. The bi-metallic blade 24 is affixed to the arm 22b by rivets 26 or similar suitable means so that as the bottom 10c heats, and the bracket 22 heats with it, the bi-metallic strip 24 partakes of the temperature variations. At its movable end 24a the thermostatic blade 24 receives a permanent magnet 28. This magnet is insulatingly supported from the blade 24 by the rivet 30 or similar device and the insulating washers 32a and 32b which sandwich the end 24a of the blade 24. The rivet 30 passes through an enlarged opening 24b in the end 24a of blade 24 so that electrical contact is not made between the rivet and the blade.

As the base 10c heats, the thermostatic blade 24 flexes in the direction of arrow A. Swingable magnetic switch blade 34 is positioned in the path of the swing of the blade 24 and the magnet 28. This blade is swingably supported from the bottom 10c of the lower bowl 10 by the bracket 36 which is carried by pin 38. The latter is insulatingly supported from the base 10c by suitable means (not shown). The bracket 36 is of L-shaped conformation and has a depending arm 36a which receives the switch blade 34. At its remote end 34a the blade 34 has a pair of contact buttons 34b which are disposed between the two adjustable fixed contacts 40a and 40b. These contacts are carried by the depending arms 40c and 40d, respectively, of the bracket 40 which is insulatingly supported from the bottom 10c of the lower bowl 10. A binding post is formed by the screw 40e which is threadedly received in the end 40f of the bracket 40. As shown in Figure 2, the heater 20 is connected by conductor 42 to one prong 44a of the appliance plug 44. The other prong 44b is connected to conductor 46 and thence through pigtail 46a to the swingable bracket 36 and the movable switch arm 34. The circuit is completed to the other side of the heater 20 through either the fixed contact 40a or the fixed contact 40b and the conductor 48.

The switch blade 34 is biased in the clockwise direction as seen in Figure 2 by the spring 50 which at one end is received in an opening in the blade 34 and at the other end extends about the insulating post 52 which extends downwardly from the bottom 10c of the lower bowl 10. Thus the switch blade 34 normally makes contact with the fixed contact 40a which is the more remote contact and the more remote position with respect to the movement of the thermostatic blade 24 which flexes in the clockwise direction as it heats.

*Practical operation*

The positions of the control elements shown in Figure 2 are thus assumed when the unit is conditioned for operation. With the lower bowl 10 filled with the required amount of water, and the upper bowl 14 supplied with the required amount of coffee C the appliance plug 44 is plugged in to supply the electrical current to the heater 20. The heater is energized since the switch blade 34 is held against the fixed contact 40a by the spring 50.

As the bottom 10c of lower bowl 10 heats, the thermostatic blade 24 flexes in the clockwise direction as indicated by the arrow A, Figure 2. While the water is boiling out of the lower bowl 10, the blade 24 remains in a position spaced from the swingable switch blade 34. However, when the water boils out of the lower bowl 10, the temperature rapidly rises above water-boiling temperature and the thermostatic blade 24 flexes to the position of Figure 3. At this time the switch blade 34, which is of magnetic material, is within the magnetic field of magnet 28 and is attracted to that magnet against the bias of the spring 50. The blade 34 accordingly snaps to the position of Figure 3 where it is physically coupled to thermostatic blade 24 through engagement of blade 34 with the magnet 28 carried by blade 24, and where blade 24 is out of contact with the fixed contact 40a and likewise out of contact with fixed contact 40b. This action occurs because the switch blade 34 is attracted to engagement with magnet 28 before the magnet actually touches the switch blade 34 so that when the switch blade 34 is attracted by the magnet it swings over a slight distance which breaks the contact by the button 34b and fixed contact 40a.

Once the swingable switch blade 34 seats against the magnet 28 in abutting relation, the magnet force holding it in that position is greatly increased. As a consequence, the thermostatic blade 24, being physically coupled with blade 34 through magnet 28, carries the switch blade 34 with it as it swings in the counterclockwise direction of Figures 2, 3 and 4 due to cooling of the base 10c. Ultimately, the thermostatic blade 24 flexes to the position shown in Figure 4 where the contact button 34b engages the fixed contact 40b. This occurs when the temperature of the bottom 10c of the bowl 10 falls to the temperature at which the brew is desired to be kept warm, such as 175° F. This energizes the heating element 20 through the circuit which can be traced through conductor 42 to prong 44a of appliance plug 44; prong 44b of the appliance plug, conductor 46 and 46a to the bracket 36 and switch blade 34; from switch blade 34 through contact button 34b and fixed contact 40b to the bracket 40; and from bracket 40 to heater 20 through conductor 48. This causes the bottom of the lower bowl to heat and ultimately causes the thermostatic blade 24 to flex in the clockwise direction to break the circuit at contacts 34b—40b and thereby maintain the desired keep-warm temperature.

When it is desired to restore the unit for a new cycle of operation, the appliance plug 44 is disconnected and the bottom 10c of the lower bowl 10 allowed to cool below keep-warm temperature. This occurs, for example, when a new supply of cool water W is placed in that bowl. When the bowl is thus cooled, the direction of thermostatic blade 24 which seeks to move in the counterclockwise direction from the position of Figure 4, is sufficient to overcome the attractive force of magnet 28 and thus cause the same to separate from the blade 34. The parts thereupon assume the positions shown in Figure 2.

Figure 5 shows an alternative form of the cycling switch mechanism in which the magnet 28 is carried by the switch blade 34 rather than the thermostatic blade 24. In this instance, the thermostatic blade 24 is made of magnetic material or, if desired, a pad of magnetic material is placed on its outer end for cooperation with magnet 28. In Figure 5 there is also shown a manual detent 54 which is slidably supported in the base 12 and is accessible from outside the base. This detent can be actuated in the direction of arrow B to engage the thermotatic blade 24 when the same is against magnet 28 and separate these parts even though the temperature is still too high to cause the blade 24 to overcome the magnet force by its own action. This permits recycling of the unit without waiting for it to cool down.

In the construction of Figures 2, 3 and 4, the switch blade 34 must be of magnetic material to be attracted by the magnet 28. Alternatively, a magnetic armature (not shown) may be affixed to the blade 34 to coact with the magnet and move the blade 34. Also, if desired, the blade 34 may be flexible and fixedly supported by bracket 36. In this event, the natural resiliency of blade 34 performs the function of spring 50 in biasing the blade to the position of Figure 2.

The contact 40a is threadedly secured in the bracket 40 and provided at its outboard end with a screw driver slot. The position of the contact can thus be manually adjusted in relation to the bracket 40 and the thermostatic blade to vary the temperature at which the magnet 28 attracts blade 34 and hence the temperature of bottom 10c at which the heater 20 is de-energized. Similarly, the contact 10b is threadedly secured in the bracket 40 and is provided at its outboard end with a screw driver slot to permit adjustment of the keeps-warm temperature at which the unit cycles in the position shown in Figure 4.

While I have shown and described specific embodiments of the present invention it will, of course, be understood that numerous modifications and alternative constructions may be made without departing from the true spirit and scope thereof. I therefore intend by the appended claims to cover all such modifications and alternative constructions as fall within the true spirit and scope.

What I claim as new, and desire to secure by Letters Patent of the United States is:

1. A vacuum type coffee maker comprising in combination: a lower bowl for water having a single electric heating element; an upper bowl for coffee having a transfer tube depending into the lower bowl to receive water therefrom; a thermostatic element affixed to the lower bowl to partake of the temperature thereof and to swing over a predetermined arc as that temperature rises; a double throw switch element disposed within the range of swing of the thermostatic element and said switch element having a pair of spaced circuit-making positions which are arranged relative to said thermostatic element so that one of said circuit-making positions is more remote with respect to the arc of swing of the thermostatic element and the other circuit-making position is less remote, the switch element being biased to the more remote circuit-making position; means defining an energizing circuit to said heating element through said switch in either position of throw; and means on one of said elements to attract the switch element against said bias and away from the more remote circuit-making position to said thermostatic element as the thermostatic element swings to juxtaposition with the switch element in response to heating of the lower bowl above water boiling temperature, said means holding said elements in engagement to move in unison under the bias of said thermostatic element as the temperature thereafter falls and to regulate about the less remote circuit-making position to keep the brew warm.

2. A vacuum type coffee maker comprising in combination: a lower bowl for water having a single electric heating element; an upper bowl for coffee having a transfer tube depending into the lower bowl to receive water therefrom; a thermostatic element affixed to the lower bowl to partake of the temperature thereof and to swing over a predetermined arc as that temperature rises; a double throw switch element disposed within the range of swing of the thermostatic element and said switch element having a pair of spaced circuit-making positions which are arranged relative to said thermostatic element so that one of said circuit-making positions is more remote with respect to the arc of swing of the thermostatic element and the other circuit-making position is less remote, the switch element being biased to the more remote circuit-making position; means defining an energizing circuit to said heating element through said switch in either position of throw; and a magnet carried by one of said elements and positioned to attract the other element to draw the switch element away from said more remote circuit-making position to said thermostatic element when the temperature of the lower bowl exceeds water boiling temperature and to hold said elements in engagement to move in unison under the bias of said thermostatic element as the temperature falls and to regulate about the less remote circuit-making position to keep the brew warm.

3. A vacuum type coffee maker comprising in combination: a lower bowl for water having a single electric heating element; an upper bowl for coffee having a transfer tube depending into the lower bowl to receive water therefrom; a thermostatic element affixed to the lower bowl to partake of the temperature thereof and to swing over a predetermined arc as that temperature rises; a double throw switch element disposed within the range of swing of the thermostatic element and said switch element having a pair of spaced circuit-making positions which are arranged relative to said thermostatic element so that one of said circuit-making positions is more remote with respect to the arc of swing of the thermostatic element and the other circuit-making position is less remote, the switch element being biased to the more remote circuit-making position; means defining an energizing circuit to said heating element through the switch in either position of throw; and a magnet carried by the thermostatic element and positioned to attract the switch element away from said more remote circuit-making position to said thermostatic element when the temperature of the lower bowl exceeds water boiling temperature and to hold said elements in engagement to move in unison under the bias of said thermostatic element as the temperature falls and to regulate about the less remote circuit-making position to keep the brew warm, and means carried by said lower bowl and selectively movable into engagement with said thermostatic element for overcoming the magnetic force so as to separate the magnet from said switch element, whereupon said switch element is again biased to said most remote circuit-making position.

4. A cycling switch mechanism for a vacuum type coffee maker or the like wherein a heating element is energized to bring the temperature of a predetermined point to a maximum value and thereafter to regulate that temperature about a lower value, the switch comprising: a thermostatic element positioned to partake of said temperature and to swing over a predetermined arc as said temperature increases to said maximum value; a double throw switch element disposed within the range of swing of the thermostatic element and said switch element having a pair of spaced circuit-making positions which are arranged relative to said thermostatic element so that one of said circuit-making positions is more remote with respect to the arc of swing of the thermostatic element and the other circuit-making position is less remote, the switch element being biased to the more remote circuit-making position and means operable to attract the switch element from the more remote circuit-making position toward said thermostatic element and against said bias when the temperature at said point reaches said predetermined maximum value and to hold said switch element and thermostatic element together for movement in unison thereafter in the same direction to regulate about the less remote circuit-making position to maintain said lower temperature value.

5. A cycling switch mechanism for a vacuum type coffee maker or the like wherein a heating element is energized to bring the temperature of a predetermined point to a maximum value and thereafter to regulate that temperature about a lower value, the switch comprising: a thermostatic element positioned to partake of said temperature and to swing over a predetermined arc as said temperature increases to the maximum value; a double throw switch disposed within the range of swing of the thermostatic element and said switch element having a pair of spaced circuit-making positions which are arranged relative to said thermostatic element so that one of said circuit-making positions is more remote with respect to the arc of swing of the thermostatic element and the other circuit-making position is less remote, the switch element being biased to the more remote circuit-making position and magnet means carried by one of said elements operable when the thermostatic element swings to the position of said maximum temperature value to attract the other of said elements and draw the switch element from the more remote circuit-making position toward said thermostatic element and against said bias and thereafter to hold said switch element and thermostatic element together for movement in unison in the same direction to regulate about the less remote circuit-making position to maintain said lower temperature value, the magnet means being further operable to release the elements when the temperature falls substantially below said lower temperature value.

6. A cycling switch mechanism for a vacuum type coffee maker or the like wherein a heating element is energized to bring the temperature of a predetermined point to a maximum value and thereafter to regulate that temperature about a lower value, the switch comprising: a heat conducting bracket affixed to said point; a bimetallic strip affixed to said bracket to partake of the temperature thereof and swing over a predetermined arc as said temperature increases to said maximum value; a magnet on the outboard end of said strip; a rockably supported switch blade of magnetic material disposed in the path of swing of said strip and adapted to be engaged by said magnet; contact buttons straddling the switch blade to make electrical contact therewith in either of two contacting-making positions spaced in the direction of movement of the bimetallic strip said two contact-making positions being arranged relative to said bimetallic strip so that one of said circuit-making positions is more remote with respect to the arc of swing of the bimetallic strip than the other circuit-making position; means biasing the switch blade towards the more remote contact-making position; the magnetic force between said magnet and said switch blade, when said magnet and switch blade are in engagement, being greater than the force of said means biasing the switch blade, said bimetallic strip being operative, after engagement of said magnet and switch blade, to swing said switch blade to its other contact-making position.

7. A cycling switch mechanism for a vacuum type coffee maker or the like wherein a heating element is energized to bring the temperature of a predetermined point to a maximum value and thereafter to regulate that temperature about a lower value, the switch comprising: a heat conducting bracket affixed to said point; a bimetallic blade affixed to said bracket to partake of the temperature thereof and swing over a predetermined arc as said temperature increases to said maximum value; a rockably supported switch blade disposed in the path of swing of said bimetallic blade and adapted to move into abutting relation therewith; contact buttons straddling the switch blade to make electrical contact therewith in either of two contacting-making positions spaced in the direction of movement of the bimetallic blade, said two contact-making positions being arranged relative to said bimetallic blade so that one of said circuit-making positions is more remote with respect to the arc of swing of the bimetallic blade than the other circuit-making position; means biasing the switch blade towards the more remote contact-making position; a magnet on one of said blades, the other of said blades including magnetic material for attraction by the magnet; the magnetic force developed, when said blades are in abutting relation, being greater than the force of said means which bias the switch blade and being operative to require said blades to move in unison, said bimetallic blade being operative, after abutting relation has been established between said blades, to swing said switch blade to its other contact-making position.

8. A thermostatically controlled switch for use in an energizing circuit for a heating means, wherein said heating means is to be energized until a first predetermined temperature is measured by said switch's thermostatic control, whereupon said heating means is de-energized and thereafter the heating is cyclically energized and de-energized about a second predetermined temperature, lower than first predetermined temperature, which is measured by said switch's thermostatic control; said thermostatically controlled switch comprising a pair of spaced contacts, a swingable blade positioned between said spaced contacts and carrying a pair of contactors each adapted to engage one of spaced contacts, means normally biasing said swingable blade so that a first of said contactors engages a first of said spaced contacts, a bimetal blade normally being spaced from said swingable blade but being constructed and arranged to swing toward said swingable blade upon an increase in temperature, mutually attractive magnetic materials on said blades adapted to develop, when said blades are still spaced, a magnetic force therebetween, which is greater than said biasing force on said swingable blade, said blades being movable toward each other into abutting relation and being thereafter movable in unison in response to falling and rising temperature to alternately move the second contactor into and out of engagement with the second of said spaced contacts.

9. A thermostatically controlled switch for use in an energizing circuit for a heating means, wherein said heating means is to be energized until a first predetermined temperature is measured by said switch's thermostatic control, whereupon said heating means is de-energized and thereafter the heating is cyclically energized and de-energized about a second predetermined temperature, lower than first predetermined temperature, which is measured by said switch's thermostatic control; said thermostatically controlled switch comprising a pair of spaced contacts, a swingable blade positioned between said spaced contacts and carrying a pair of contactors each adapted to engage one of spaced contacts, means normally biasing said swingable blade so that a first of said contactors engages a first of said spaced contacts, a bimetal blade normally being spaced from said swingable blade but being constructed and arranged to swing toward said swingable blade upon an increase in temperature, mutually attractive magnetic materials on said blades adapted to develop, when said blades are still spaced, a magnetic force therebetween, which is greater than said biasing force on said swingable blade, said blades being movable toward each other into abutting relation and being thereafter movable in unison in response to falling and rising temperatures to alternately move the second contactor into and out of engagement with the second of said spaced contacts, said swingable blade being electrically conductive, and means electrically insulating said blades when they are in said abutting relation with each other.

10. A thermostatically controlled switch for use in an energizing circuit for a heating means, wherein said heating means is to be energized until a first predetermined temperature is measured by said switch's thermostatic control, whereupon said heating means is de-energized and thereafter the heating is cyclically energized and de-energized about a second predetermined temperature, lower than first predetermined temperature, which is measured by said switch's thermostatic control; said thermostatically controlled switch comprising a pair of spaced contacts, a swingable blade positioned between said spaced contacts and carrying a pair of contactors each adapted to engage one of spaced contacts, means normally biasing said swingable blade so that a first of said contactors engages a first of said spaced contacts, a bimetal blade normally being spaced from said swingable blade but being constructed and arranged to swing toward said swingable blade upon an increase in temperature, mutually attractive magnetic materials on said blades adapted to develop, when said blades are still spaced, a magnetic force therebetween which is greater than said biasing force on said swingable blade, said blades being movable toward each other into abutting relation and being thereafter movable in unison in response to falling and rising temperatures to alternately move the second contactor into and out of engagement with the second of said spaced contacts, and means selectively movable into engagement with said thermally responsive blade for overcoming the magnetic force between said abutting blades to separate same, whereupon said switch is restored to its original condition.

11. A thermostatically controlled switch for use in an energizing circuit for a heating means, wherein said heating means is to be energized until a first predetermined temperature is measured by said switch's thermostatic control, whereupon said heating means is de-energized and thereafter the heating is cyclically energized and de-energized about a second predetermined temperature, lower than first predetermined temperature, which is measured by said switch's thermostatic control; said thermostatically controlled switch comprising a pair of spaced contacts, a swingable blade positioned between said spaced contacts and carrying a pair of contactors each adapted to engage one of spaced contacts, means normally biasing said swingable blade so that a first of said contactors engages a first of said spaced contacts, a thermally responsive blade normally being spaced from said swingable blade but being constructed and arranged to swing toward said swingable blade upon an increase in temperature, a magnet on one of said blades and magnetic material, for attraction of said magnet, on the other said blade, the magnetic force developed between the said blades being greater than the said biasing force when said thermally responsive blade is spaced a predetermined distance from said swingable blade, said magnetic force being operative to cause said swingable blade to move into abutting relation with said thermally responsive blade, thereby separating said first contactor and said first of the spaced contacts, and said magnetically attracted blades, while in abutting relation, being movable in unison under the urging of said thermally responsive blade, in response to falling and rising temperatures to alternately move to the second contactor into and out of engagement with the second of said spaced contacts.

12. A thermostatically controlled switch for use in an energizing circuit for a heating means, wherein said heating means is to be energized until a first predetermined temperature is measured by said switch's thermostatic control, whereupon said heating means is de-energized and thereafter the heating is cyclically energized and de-energized about a second predetermined temperature, lower than first predetermined temperature, which is measured by said switch's thermostatic control; said thermostatically controlled switch comprising a pair of spaced contacts, a swingable blade positioned between said spaced contacts and carrying a pair of contactors each adapted to engage one of spaced contacts, said swingable blade being adapted to be positioned between said spaced contacts with both said contactors spaced from said spaced contacts, means normally biasing said swingable blade so that a first of said contactors engages a first of said spaced contacts, a thermally responsive blade normally being spaced from said swingable blade but being constructed and arranged to swing toward said swingable blade upon an increase in temperature, a magnet on one of said blades and magnetic material, for attraction of said magnet, on the other said blade, the force of said means biasing said swingable blade being so selected and designed, and said magnetic force being so selected and designed, that the magnetic force developed between the said blades becomes greater than the said biasing force when said thermally responsive blade is spaced a predetermined distance from said swingable blade, said greater magnetic force being operative to cause said blades to move toward each other and to form a physical coupling therebetween, through engagement of parts thereon, at a position where both contactors are spaced from said spaced contacts, whereupon said circuit means are de-energized, and said bimetal blade being thereafter responsive to falling and rising temperatures to alternately move the second contactor into and out of engagement with the second of said spaced contacts.

References Cited in the file of this patent

UNITED STATES PATENTS

| | | |
|---|---|---|
| 1,958,482 | Leins | May 15, 1932 |
| 2,240,847 | Hildebrecht | May 6, 1941 |
| 2,262,286 | Ireland | Nov. 11, 1941 |
| 2,651,707 | Jepson | Sept. 8, 1953 |
| 2,659,787 | Prickett | Nov. 17, 1953 |
| 2,664,811 | Jepson | Jan. 5, 1954 |
| 2,667,565 | Wallower | Jan. 26, 1954 |